US008161386B1

(12) United States Patent
Mark

(10) Patent No.: US 8,161,386 B1
(45) Date of Patent: Apr. 17, 2012

(54) METHOD AND APPARATUS FOR REMOTE WEB-BASED TECHNICAL SUPPORT

(75) Inventor: Haggai Mark, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 773 days.

(21) Appl. No.: 10/236,054

(22) Filed: Sep. 4, 2002

(51) Int. Cl.
*G06F 3/00* (2006.01)

(52) U.S. Cl. ........ 715/712; 715/705; 715/708; 715/709; 715/762

(58) Field of Classification Search .................. 715/705, 715/708, 709, 712, 713, 760, 762
See application file for complete search history.

(56) References Cited

U.S. PATENT DOCUMENTS

| | | | | |
|---|---|---|---|---|
| 4,648,062 A | | 3/1987 | Johnson et al. | |
| 5,122,972 A | * | 6/1992 | Richards et al. | 715/712 |
| 5,317,688 A | * | 5/1994 | Watson et al. | 715/707 |
| 5,442,759 A | * | 8/1995 | Chiang et al. | 705/326 |
| 5,469,540 A | * | 11/1995 | Powers et al. | 715/500.1 |
| 5,481,667 A | * | 1/1996 | Bieniek et al. | 715/709 |
| 5,550,967 A | * | 8/1996 | Brewer et al. | 715/709 |
| 5,764,960 A | | 6/1998 | Perks et al. | |
| 5,781,191 A | | 7/1998 | Mayuzumi et al. | |
| 5,822,123 A | | 10/1998 | Davis et al. | |
| 5,825,356 A | * | 10/1998 | Habib et al. | 715/712 |
| 5,933,140 A | * | 8/1999 | Strahorn et al. | 715/712 |
| 6,012,075 A | | 1/2000 | Fein et al. | |
| 6,211,874 B1 | | 4/2001 | Himmel et al. | |
| 6,307,544 B1 | * | 10/2001 | Harding | 715/709 |
| 6,340,977 B1 | * | 1/2002 | Lui et al. | 715/709 |
| 6,392,670 B1 | | 5/2002 | Takeuchi et al. | |
| 6,421,065 B1 | * | 7/2002 | Walden et al. | 715/712 |
| 6,687,485 B2 | * | 2/2004 | Hopkins et al. | 434/350 |
| 6,928,625 B2 | * | 8/2005 | Makinen | 715/822 |
| 7,080,321 B2 | * | 7/2006 | Aleksander et al. | 715/708 |
| 7,299,289 B1 | * | 11/2007 | Lorenz et al. | 709/231 |
| 7,343,307 B1 | * | 3/2008 | Childress | 705/4 |
| 2002/0004842 A1 | * | 1/2002 | Ghose et al. | 709/235 |
| 2002/0118220 A1 | | 8/2002 | Liu et al. | |
| 2002/0154153 A1 | | 10/2002 | Messinger et al. | |
| 2002/0168621 A1 | | 11/2002 | Cook et al. | |

OTHER PUBLICATIONS

Sunrise, "Glossary", Oct. 31, 2001, Sunrise Computer Services Ltd.*

* cited by examiner

*Primary Examiner* — Alvin Tan

(57) ABSTRACT

A system provides task-oriented enhancement of a software application that allows for remote, Web-based, technical support. The system observes user-interactive elements in the software application. Based on the observed user-interactive elements, the system generates at least one task indication and at least one respective instruction indication associated with the software application. Generation of the indications may be done dynamically as the software application loads or executes. The system may be activated locally or remotely to provide technical support, or "coaching", to a user. The system may also be used to generate documentation for the software application.

46 Claims, 13 Drawing Sheets

METHOD AND APPARATUS FOR REMOTE WEB-BASED TECHNICAL SUPPORT

BACKGROUND OF THE INVENTION

No doubt the continued widespread use of computers by the general public is due at least in part to the development of easy to use graphical user interfaces (GUIs) in operating systems and application software. Indeed, almost all consumer and even new professional quality applications are compliant with either the Microsoft Windows® or Apple Computer® Macintosh operating system interfaces and their menu driven paradigms.

Despite the widespread belief that such interfaces are easy to use, the complexity of many applications continues to grow. As more features are added to particular software applications, the more likely it is that even a sophisticated user would frequently become uncertain how to proceed. They need information immediately relevant to the next step in their current task. Users turn to printed or online documentation reluctantly and have been observed to ignore such help even when it presents to them the precise answer that they want.

And, while telephone support is another way to obtain assistance, such services are expensive and time consuming. When users call up technical support, customer support engineers (CSEs) have to work closely with the users, and rely on them to perform certain activities and report results back to the CSEs, so that the CSEs can reach conclusions and troubleshoot correctly. It is a very time consuming and error prone process, often causing a lot of frustration for both CSEs and users and low user satisfaction.

Software applications and consumer devices are seldom designed with supportability in mind. This makes it hard for CSEs to troubleshoot problems. It is very costly to send CSEs on site to see for themselves what the problems are, analyze and fix them. As a result, most software vendors rely upon detailed, on-line help files to provide relevant guidance. The help files are usually custom designed for each application. The help files must be updated to reflect changes made to the corresponding application. This demands considerable development and support time.

One traditional approach to providing on-line guidance is embedded help, where the help information is closely integrated with the graphical user interface (GUI). Extant on-line help systems use a Help menu, context-sensitive help links, and various methods of embedding help links in the GUI. For example, a help link may appear (i) in a menu next to a menu item that opens a dialog box; (ii) as a Help button within the dialog box; (iii) as a tool tip that appears when the mouse cursor lingers over an object within the dialog box; or (iv) in a help window alongside the GUI that always displays the help topic for the currently active dialog box. In all these cases, the help text describes aspects of the GUI in a generic way, not specific to the user's current purpose or task.

Another approach is a so-called "Wizard", which prompts the user to select from a list of predefined common tasks. For a selected task, the wizard substitutes a separate so-called "wizard interface" on top of the GUI. The wizard prompts the user for information needed to complete a task then completes the predetermined task "under the hood," in the sense that the user does not see or understand how the task is completed. Another approach is what is referred to as "show me" help, which uses animations to perform tasks for the user. It uses the same GUI, but it still takes control from the user. It is launched from a conventional help topic, so the user must first have accessed the help system.

SUMMARY OF THE INVENTION

The approaches in the prior art tend to restrict a user's maximum learning potential. For example, the embedded help approach opens an external window from the GUI with which the user must interact, thereby causing a loss of attention and disjointed learning. The so-called "wizard" approach tends to take a substantial amount of control away from the user by "hiding" the actual software application, thereby providing function but not user learning. The so-called "show me" help approach requires a user to first open a separate window, then takes full control from the user, resulting in the same problems as the wizard approach.

Briefly, a system employing the principles of the present invention, also referred to herein as a "bolt-on coach," addresses the problems of the prior art. It provides the user with the ability to interact with the software application itself in real-time while receiving coaching on an as-needed or customer service engineer (CSE) instantiated basis from the bolt-on coach. The application need not be rewritten by the software developer to support the bolt-on coach functionality; instead, the bolt-on coach learns about the application prior to run time and provides support based on what it has learned, optionally adding enhancements to the application that support and improve the coaching.

Accordingly, the system observes elements of a software application with which a user may interact. Based on those observations, the system generates indications of at least one task associated with the user-interactive elements. The system also generates indications of at least one instruction, herein interchangeably referred to as steps in some embodiments, associated with the task(s). The user benefits from the task(s) and instructions in learning how to use the software application; thus, the system provides task-oriented enhancement of the software application.

In an alternative embodiment, a user knowledgeable with the software application or a designer of the software application may predefine tasks and associated instructions, optionally using an editor designed for this purpose. The system may observe the predefined tasks and instructions and generate indications, accordingly.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
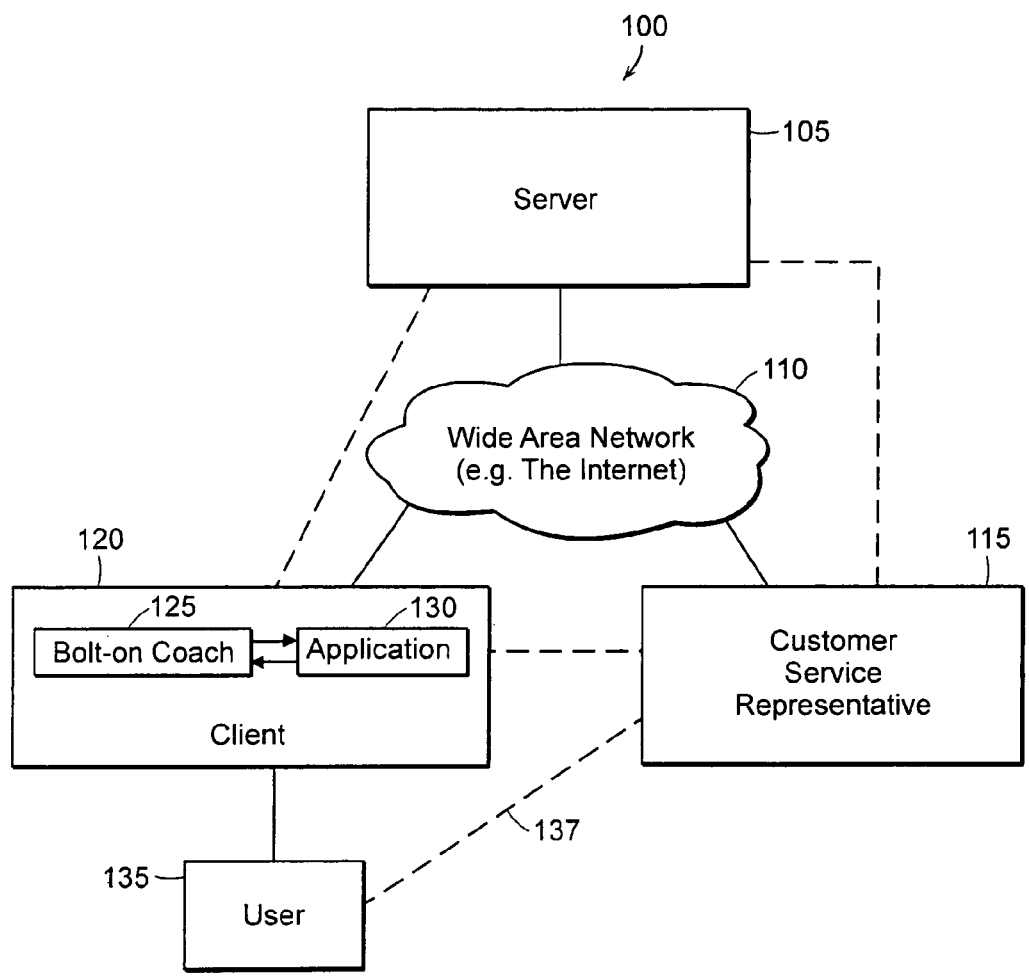
FIG. 1 is a block diagram illustrating an exemplary computer network in which an embodiment of the bolt-on coach may be deployed.

A description of preferred embodiments of the invention follows.

A system employing the principles of the present invention is referred to herein as a "bolt-on coach." This bolt-on coach is applicable to applications and devices that are computer network-enabled or Web-enabled (i.e., have a World Wide Web-based user interface, or UI) or non-network based. When either customer service engineers (CSEs) or customers want to enter into "support/training mode," additional functionality may be made visible by "bolting it on" to the UI. This functionality may be instantiated "on-the-fly" as the application Web-based interface is streamed down from a server to a client in the Web-based or network-based embodiment, or during application load-time in a stand-alone computer embodiment.

The additional bolt-on functionality includes a series or set of tasks relevant to troubleshooting or diagnosing problems with the application or device, and each task is provided to the user as individual instructions or steps. At this point, the CSEs can remotely walk customers through the tasks, using the Cisco® Collaboration Server for example, while customers are watching and learning, or the customers themselves can walk through the steps in an effort to troubleshoot or diagnose the application on their own. It should be understood that troubleshooting and diagnostic testing is merely one use for a system employing the teachings herein and that this same bolt-on approach can be used to specify any tasks the application supports or affords, including non-diagnostics or normal operations related tasks.

In a network-based embodiment, the way the tasks and steps are generated is based on parsing and analyzing web-based interface elements as they are streamed from the server. If the UI contains user-interactive elements, such as buttons, drop-down boxes, lists, text fields, etc., control tasks and steps are created for them "on the fly," and organized in a task-based panel that may be displayed alongside or independently of the original UI, appended to the UI, or applied to the UI toolbar. This does not require any planning and intervention from the original application or UI developers; it is truly a bolt-on panel.

In cases where the application or the diagnostics tasks/procedures are complex, it may be useful to define them ahead of time, as part of the application or device design, development, or support effort. In those cases, "bolt-on hints" are optionally embedded in the bolt-on coach, so that, while streaming from the server, the bolt-on panel is generated based on those hints.

This approach enables both customers and CSEs to be more effective and efficient when troubleshooting a device or application, while not overburdening the designers and developers. It bolts-on diagnostics, tasks, and activities that can be called on demand and structures the activities by tasks and instructions, while directly manipulating the application or device.

This approach dramatically reduces back and forth communications between the CSEs and customers as they work through a problem, saves time, reduces frustration, and increases customer satisfaction.

Further, this approach reminds the CSEs of tasks and steps available to them (i.e., the UI is "self documenting for diagnostics" when this diagnostics/training mode is turned on), saves problem research time and training costs for the CSEs, and shows the customers how to go about helping themselves. The customers can watch the CSEs the first time, but do it themselves if a problem occurs, which increases customer self-help, and reduces customer support costs.

The bolt-on aspect of the present invention allows for a varying level of involvement and effort on the part of the original application or device designers and developers. In many cases, parsing the UI can reveal the useful tasks and steps, which also reduces design and development costs. The bolt-on coach can be activated or hidden by the user or CSE. This "hidden" mode (i.e., selectable bolt-on support/training mode) eliminates UI clutter during normal operation, but makes it instantaneously available when needed.

FIG. 1 is a block diagram illustrating an exemplary computer network 100 in which an embodiment of the bolt-on coach may be deployed. A server 105, such as an applications server or a Web server, may be connected to a Wide Area Network (WAN) 110, such as the Internet. A Customer Service Representative (or Customer Support Engineer) 115 may also be connected to the WAN 110. A client 120, such as a personal computer, may be connected to the WAN 110. A user 135 may be coupled to (i.e., operating) the client 120 to perform typical computing operations, such as word processing or computer network management. In alternative embodiments, the Customer Service Representative 115 may be connected to the server 105 or the client 120, as represented by dashed lines that circumvent the WAN 110. When contacting the Customer Service Representative 115, the user 135 may call, fax, email, or use another form of communication, as represented by a dashed line 137.

In operation, the user 135 may be running an application 130 and a bolt-on coach 125 on the client 120. The bolt-on coach 125 may be, for example, a custom software application or a Java™ applet. The application 130 and bolt-on coach 125 may communicate or interact with each other or have one-way interaction. Elements of the application 130 that a user 135 may interact with may be observed by the bolt-on coach 125, where these elements may include GUI checkboxes, radio buttons, or text input fields.

In pre-runtime, the bolt-on coach 125 may observe by parsing and analyzing the web-based user interface elements of the application 130 as the application 130 streams from the server 105 to the client 120 or while the application 130 loads in the network or a non-network client 120 environment. In operation (i.e., runtime), observing by the bolt-on coach 125 may include tracking user interaction with the application 130 or providing feedback to the user 135 based on the user's interaction with the application 130. The runtime observing may be accomplished, for example, by intercepting public events or messages in the byte-stream of the application 130.

Based on the pre-runtime observations, the bolt-on coach 125 may generate at least one indication of a task associated with the user-interactive elements. The bolt-on coach 125 may also generate at least one indication of an instruction, herein interchangeably referred to as a step in some embodiments, associated with the task. In one embodiment, task and instruction indications are generated from the user-interactive elements "on-the-fly" and organized, for example, in a task-based panel that may be (i) hidden until activated by the user 135, (ii) displayed alongside a graphical user interface of the application 130, or (iii) incorporated into the graphical user interface of the application 130. The task and instruction indications may include text, hot-links, buttons, drop-down boxes, list boxes, and so forth.

An example scenario in which the bolt-on coach 125 is activated may be the following. The user 135 may contact the Customer Service Representative 115 to request assistance with problems encountered in the application 130. The user 135 and the Customer Service Representative 115 may communicate with each other in various ways, such as via telephone, email, and Internet messages.

In response to these communications and the types of questions being asked, the Customer Service Representative 115 may remotely cause the bolt-on coach 125 to provide coaching for the task associated with the application 130 to provide technical support to the user 135. This remote control of the bolt-on coach 125 by the Customer Service Representative 115 may occur through packetized communication between the bolt-on coach 125 and the Customer Service Representative 115 via typical or custom WAN 110 communications.

Figure 2A:
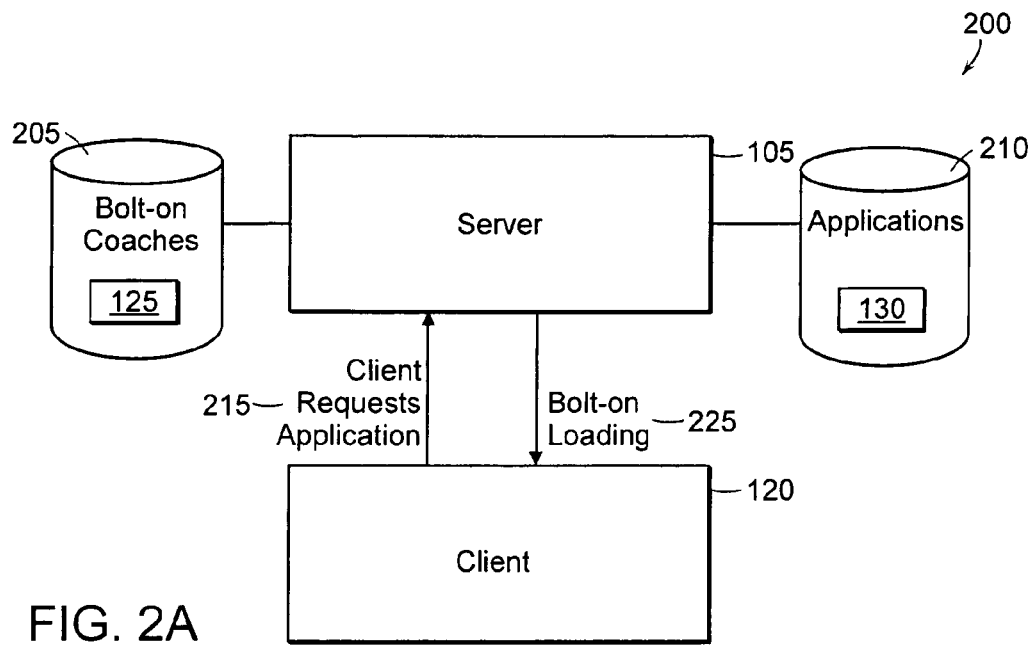
FIG. 2A is the first of a sequence of state diagrams representing an example embodiment of a loading process of the bolt-on coach of FIG. 1.

FIG. 2A is the first of a sequence of state diagrams representing an example embodiment of a loading process of the bolt-on coach 125 in a computer system 200 or, by way of extension, the computer network 100 (FIG. 1). In this example, the server 105 may be connected to a storage 205 containing bolt-on coaches, including the bolt-on coach 125 introduced above. The server 105 may also be connected to a storage 210 containing applications, including the application 130 introduced above. The client 120 may be connected to the server 105. The server 105, client 120, storage 205, and storage 210 may be on the same machine or on separate machines connected, for example, by a local area network or the WAN 110 and may share computer processors, working memory, and other computing peripherals or be equipped separately with same.

In this first of the sequence of state diagrams, the client 120 may send a request for the application 130 to the server 105 (step 215). The server 105 responds by downloading the bolt-on coach 125 associated with the requested application 130 to the client 120 (step 225).

Figure 2B:
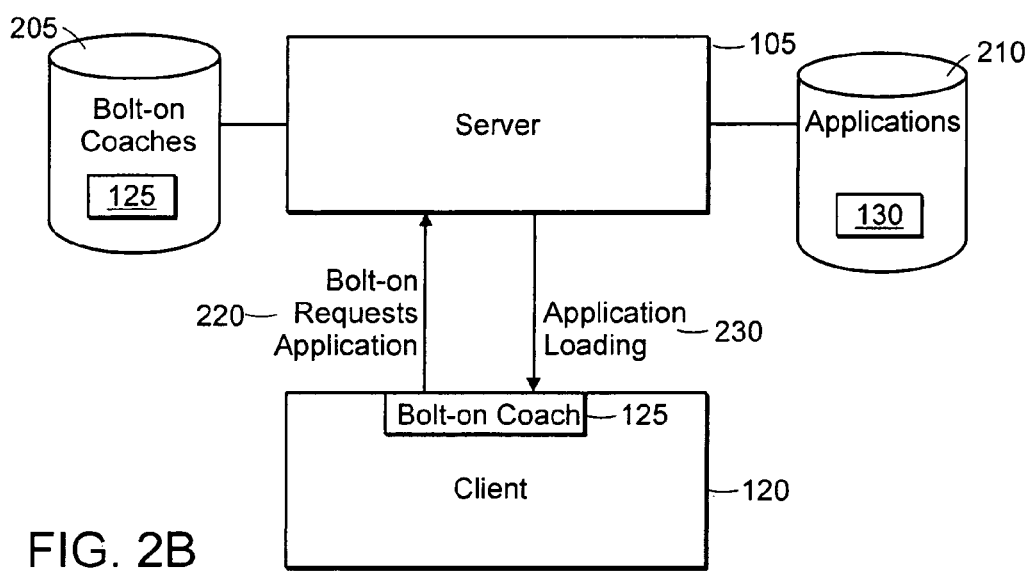
FIG. 2B is the second of the sequence of state diagrams following FIG. 2A.

FIG. 2B shows the state of the computer system 200 after the bolt-on coach 125 has been downloaded to the client 120. Once downloaded, the bolt-on coach 125 sends or instructs the client 120 to send a request for the associated application 130 (step 220). The server 105 responds by downloading the application 130, originally requested by the client 120.

During the downloading process or at least before run-time of the application 130, the bolt-on coach 125 observes user-interactive elements of the application 130 (step 230). Based on the observations of the user-interactive elements, the bolt-on coach 125 generates task and instruction indications.

Figure 2C:
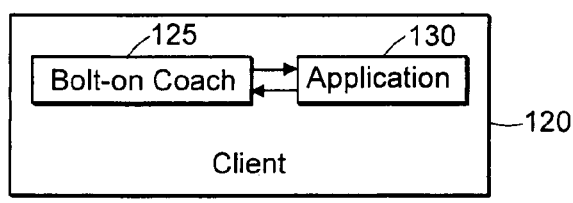
FIG. 2C is the third of the sequence of state diagrams following FIG. 2B.

FIG. 2C illustrates the state of the computer system 200 after the application 130 has been downloaded. The client 120 may now be in a state like that of the client 120 shown in FIG. 1, ready to perform for the user 135 as described above in reference to FIG. 1.

Figure 3A:
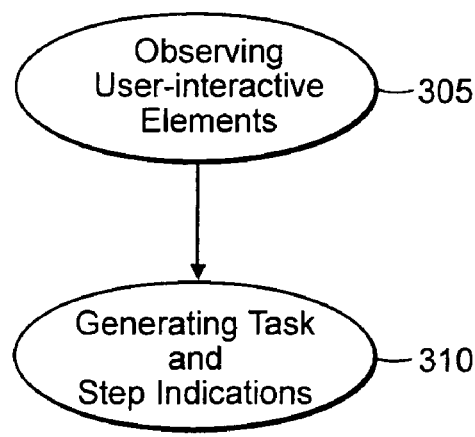
FIG. 3A is a flow diagram illustrating a process of the bolt-on coach of FIG. 1.

FIG. 3A is a flow diagram illustrating a basic embodiment of the bolt-on coach 125. In step 305, the bolt-on coach 125 observes the user-interactive elements of a software application, such as previously discussed during the downloading process of application 130. In step 310, the bolt-on coach 125 generates task and instruction indications based on the observed user-interactive elements.

Figure 3B:
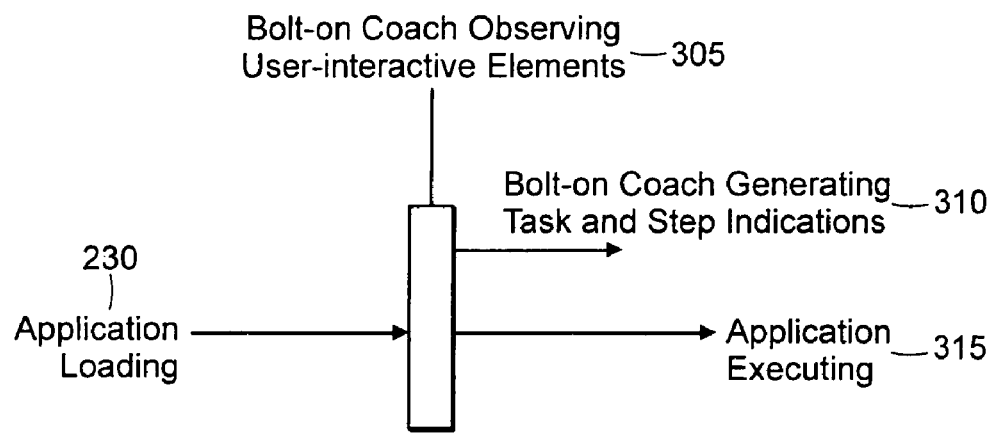
FIG. 3B is a time line visual representation of the process of FIG. 3A.

FIG. 3B is a time line visual representation of a possible operational implementation of the bolt-on coach 125 of the embodiment in FIG. 3A. The bolt-on coach 125 observes user-interactive elements (step 305) and generates task and instruction indications (step 310) while the application 130 is loading (step 230). The application 130 may, for example, be loaded from a local server, a network server, or a local storage device such as a hard drive. After the application 130 loads (step 230), the application may execute (step 315).

Figure 3C:
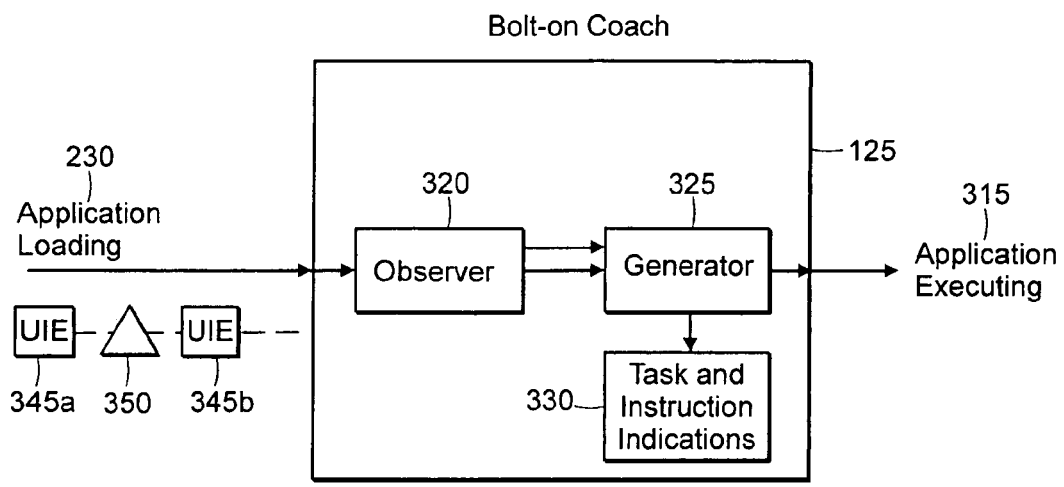
FIG. 3C is a block diagram illustrating an example apparatus form of the bolt-on coach of FIG. 1.

FIG. 3C is a block diagram illustrating an example load-time (i.e., pre-runtime) embodiment of the bolt-on coach 125. During the loading process (step 230), the application 130 may have user-interactive elements 345a and 345b as well as other elements 350. The user-interactive elements 345a and 345b may include such elements as text fields, hot-links, list boxes, check boxes, and radio buttons. The other elements 350 may include any non-user-interactive elements of the application 130.

The bolt-on coach 125 may include an observer 320 and a generator 325. As the application 130 loads (step 230), the observer 320 observes the user-interactive elements 345a and 345b. The observer 320 may communicate to the generator 325 information gained as a result of observing the user-interactive elements 345a and 345b. The observer 320 may (i) embed the information in the application 130 as it loads and passes through the observer 320 on the way to the generator 325 or (ii) send the information to the generator 325 in a separate communication. Based on the information received from the observer 320, the generator 325 may generate task and instruction indications 330. In one embodiment, the generator 325 adds functionality to the application 130 as it loads. When the application 130 finishes loading, it may begin executing (step 315) on the client 120 or other computing device. It should be understood that the loading process (step 230) may occur locally on a computer or via a network connection.

Figure 3D:
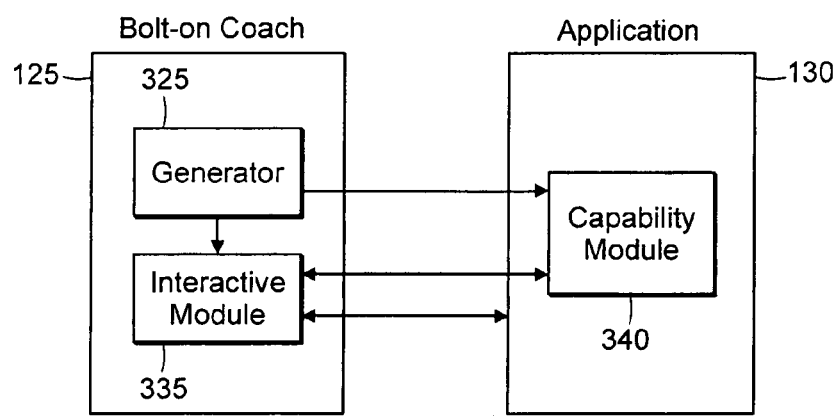
FIG. 3D is a block diagram illustrating an alternative embodiment of the bolt-on coach apparatus of FIG. 3C.

FIG. 3D is a block diagram illustrating an example of run-time embodiment of the bolt-on coach 125. In this embodiment, the bolt-on coach 125 includes the generator 325. The generator 325 may generate a capability module 340 or interactive module 335. The generator 325 generates these modules 340 or 335, for example, as the application 130 is loading or executing. The interactive module 335 may be included in the bolt-on coach 125. The capability module 340 may be included in the application 130. The interactive module 335 and capability module 340 may support interactivity between the bolt-on coach 125 and application 130. It should be understood that there may be multiple instances of these modules 335 and 340.

In operation, the interaction between the interactive module 335 and capability module 340 may include bidirectional messaging or control. For example, the capability module 340 may provide additional user interactive elements to the application 130. The additional user interactive elements may be coupled to the generator 325, the software application 130, or an observer, such as the observer 320 discussed in reference to FIG. 3C. The additional user-interactive elements may be displayed on a separate panel, incorporated into a graphical user interface of the application 130, or hidden until activated. In an alternative embodiment, the interactive module 335 and capability module 340 may communicate with one another. The communication may be bidirectional and include typical or custom messaging and control capabilities.

Figure 4:
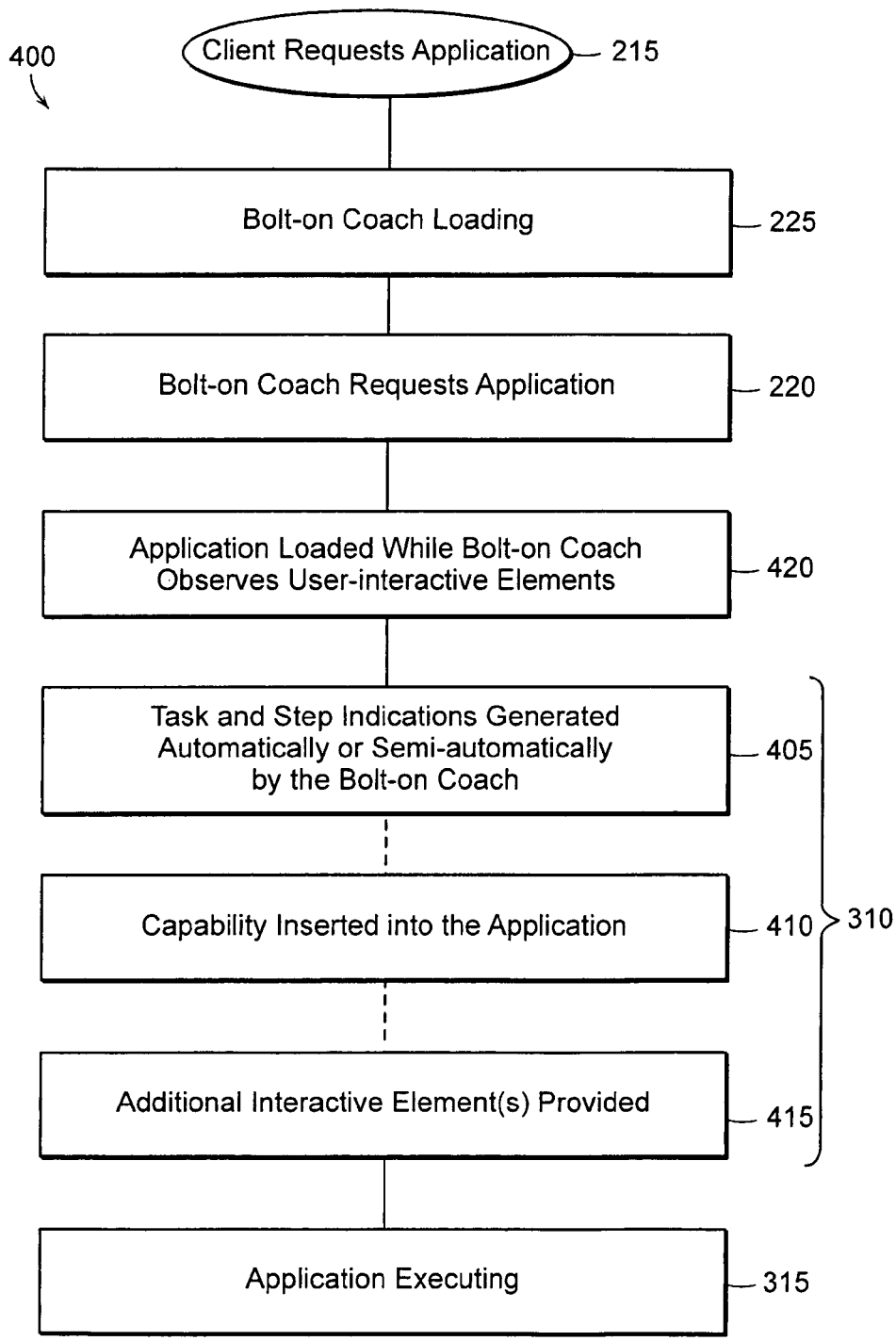
FIG. 4 is a flow diagram illustrating a load time process of the bolt-on coach of FIG. 1.

FIG. 4 is an illustration of an embodiment of a process 400 performed by the bolt-on coach 125 as it may operate in a prerun-time environment. The process 400 may begin when a client, such as client 120 from FIG. 1, requests a software application, such as application 130 from FIG. 1 (step 215). The request may be sent, for example, to a processor on the client 120 or to a processor on the server 105 (FIG. 1). In response to the request, the bolt-on coach 125 is loaded (step 225) onto the client 120.

After the bolt-on coach 125 is loaded, the bolt-on coach 125 requests the application 130 (step 220). Next, the application 130 may be loaded while the bolt-on coach 125 observes the user interactive elements (step 420). Based on the observed user interactive elements, the bolt-on coach 125 generates task and instruction indications automatically or semi-automatically (step 405). The bolt-on coach 125 may insert capability into the application (step 410). In step 415, the bolt-on coach 125 may provide additional user interactive elements. Steps 405, 410 and 415 may be parts of step 310 shown in FIG. 3A. At this point, the application may begin executing (step 315).

Figure 5:
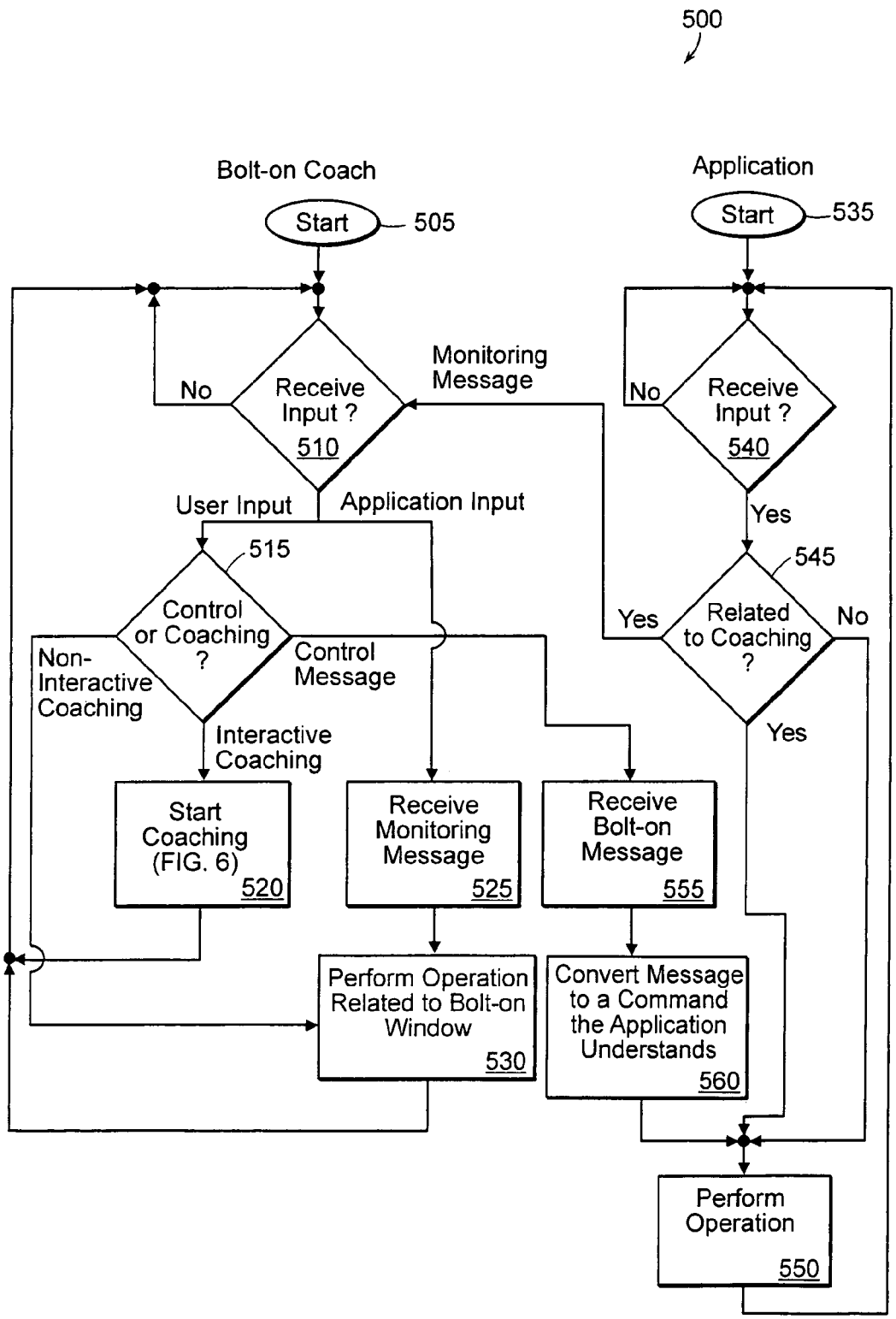
FIG. 5 is a flow diagram illustrating an execution time process of the bolt-on coach of FIG. 1.

FIG. 5 is an illustration of an embodiment of the bolt-on coach 125 that may occur at execution time. The process 500 may include the bolt-on coach 125 and application 130 running concurrently. The bolt-on coach process starts at step 505, and the application process starts at step 535.

Referring first to the application process, after the start of the application process in step 535, the application 130 checks to see if it has received an input (step 540). If no input has been received, the application 130 continues to check to see if input has been received (step 540). If the application 130 did receive input, it proceeds to check if the input is related to coaching (step 545). If the input is related to coaching, a monitoring message is sent to the bolt-on coach, and the operation corresponding to the input is performed (step 550). If the received input is not related to coaching, then the application 130 proceeds to perform the operation (step 550). After the operation is performed in step 550, the application 130 returns to checking to see if it has received input (step 540).

Referring now to the bolt-on coach process, after the bolt-on coach process starts in step 505, it proceeds to check if it has received any input (step 510). If no input has been received, the bolt-on coach 125 continues to check for input (step 510). Once the bolt-on coach 125 has received input, it determines whether the input is user 135 input or application 130 input. If the received input is application 130 input, the bolt-on coach 125 has received a monitoring message or other suitable form of input from the application 130 (step 525). In response to the monitoring message, the bolt-on coach 125 performs an operation related to the bolt-on coach window (step 530). An example of the bolt-on coach window is discussed later in references to FIGS. 8 and 9.

After the operation is completed in step 530, the bolt-on coach 125 returns to checking for input (step 510). If the input received by the bolt-on coach 125 in step 510 is user 135 input, the bolt-on coach 125 determines whether it is control or coaching input (step 515). Control input means that the user 135 or other input source has requested the bolt-on coach 125 to perform a selected action. Coaching input means that the user 135 or other input source has requested the bolt-on coach to provide coaching about a selected feature of the application 130.

If the user 135 input is control input, then a control message is sent to the application 130 and the application 130 receives the bolt-on coach message in step 555. The application 130 may then convert the message to perform an operation the application 130 understands (step 560). The application 130 may then perform the operation (step 550) and return to checking for input (step 540).

Figure 6:
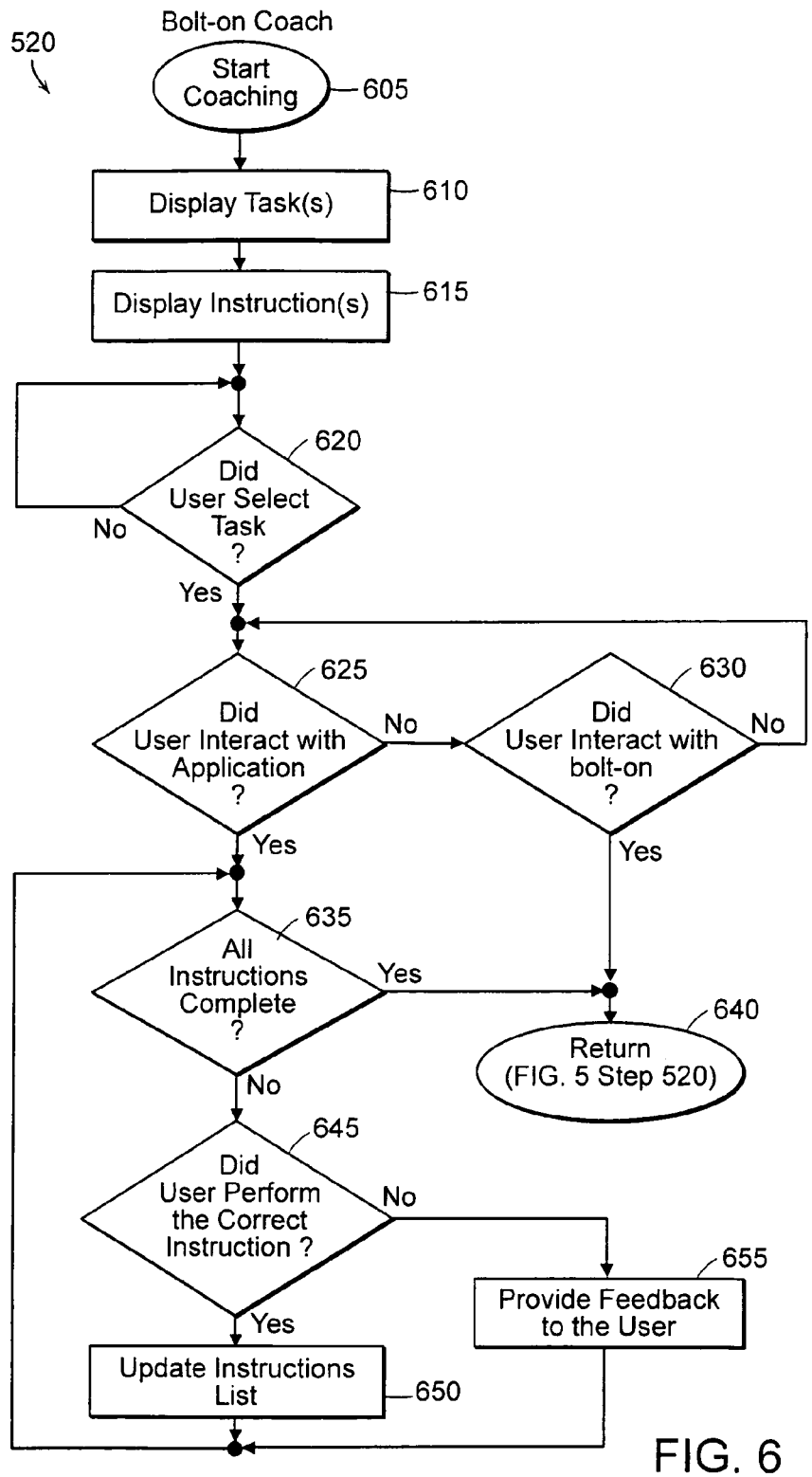
FIG. 6 is a flow diagram of a detailed process occurring during the execution time process of FIG. 5.

If the bolt-on coach 125 determines in step 515 that the user 135 input is coaching input, the bolt-on coach 125 may further determine whether the coaching is non-interactive or interactive. If the coaching request is determined to be non-interactive, the bolt-on coach 125 proceeds by performing the operation related to the bolt-on coach window (step 530) and then back to checking for input (step 510). If the coaching request is determined to be interactive, the bolt-on coach 125 starts coaching (step 520). Example details of the coaching process are shown in FIG. 6 described below. After the coaching process 520 is complete, the bolt-on coach 125 returns to checking for input (step 510).

FIG. 6 is an illustration of an embodiment of the bolt-on coaching process 520 with decisions based on user 135 interaction. In step 605, the bolt-on coach 125 begins coaching. At step 610, the bolt-on coach 125 may display indications of one or more tasks. The indications may have been generated, for example, in step 310 of FIG. 3A in the pre-runtime activities. The bolt-on coach 125 may then proceed to display indications of one or more instructions (step 615) associated with a task. The instruction indications may also have been generated, for example, in step 310 of FIG. 3A. The process 520 continues in step 620 by querying whether the user 135 selected a task. If the user 135 did not select a task, the process 520 continues to wait for the user 135 to select a task (step 620). The process 520 continues in step 625 by determining whether the user 135 interacted with the application 130.

If the user 135 did not interact with the application in step 625, the process 520 continues by determining if the user 135 interacted with the bolt-on coach 125 (step 630). If the user 135 did not interact with the bolt-on coach 125 in step 630, the process 520 continues by looping back to step 625. If it is determined that the user 135 did interact with the bolt-on coach 125 in step 630, then the bolt-on coach process 520 continues in step 640 by returning to FIG. 5, step 520.

If in step 625 it was determined that the user 135 interacted with the application 130, the process 520 continues in step 635 by querying whether all instructions in the task are complete. If all instructions are complete, the bolt-on coaching process 520 continues in step 640 by returning to FIG. 5, step 520. If all instructions are not complete, the bolt-on coaching process 520 continues by querying whether the user 135 performed the correct instruction (step 645). If the user 135 did not perform the correct instruction in step 645, the process 520 continues to step 655, where the bolt-on coach 125 provides feedback to the user 135, and then loops back to step 635. If the user 135 performed the correct instruction in step 645, then the process 520 continues in step 650 by updating the instruction list and then looping back to step 635.

The processes 400 (FIG. 4), 500 (FIG. 5), and 520 (FIG. 6) may be implemented in software, firmware, or hardware. In the case of software, the software may be stored in various forms, such as human or machine-readable code, on various forms of machine readable media, such as RAM, ROM, CD-ROM, and magnetic or optical media. The software may be loaded or downloaded and executed by a processor(s) in any of the machines described above, where the processor(s) may be a special purpose or general processor(s). An example computer system capable of executing the bolt-on coach 125 and application 130 is discussed later in reference to FIG. 12.

Figure 7:
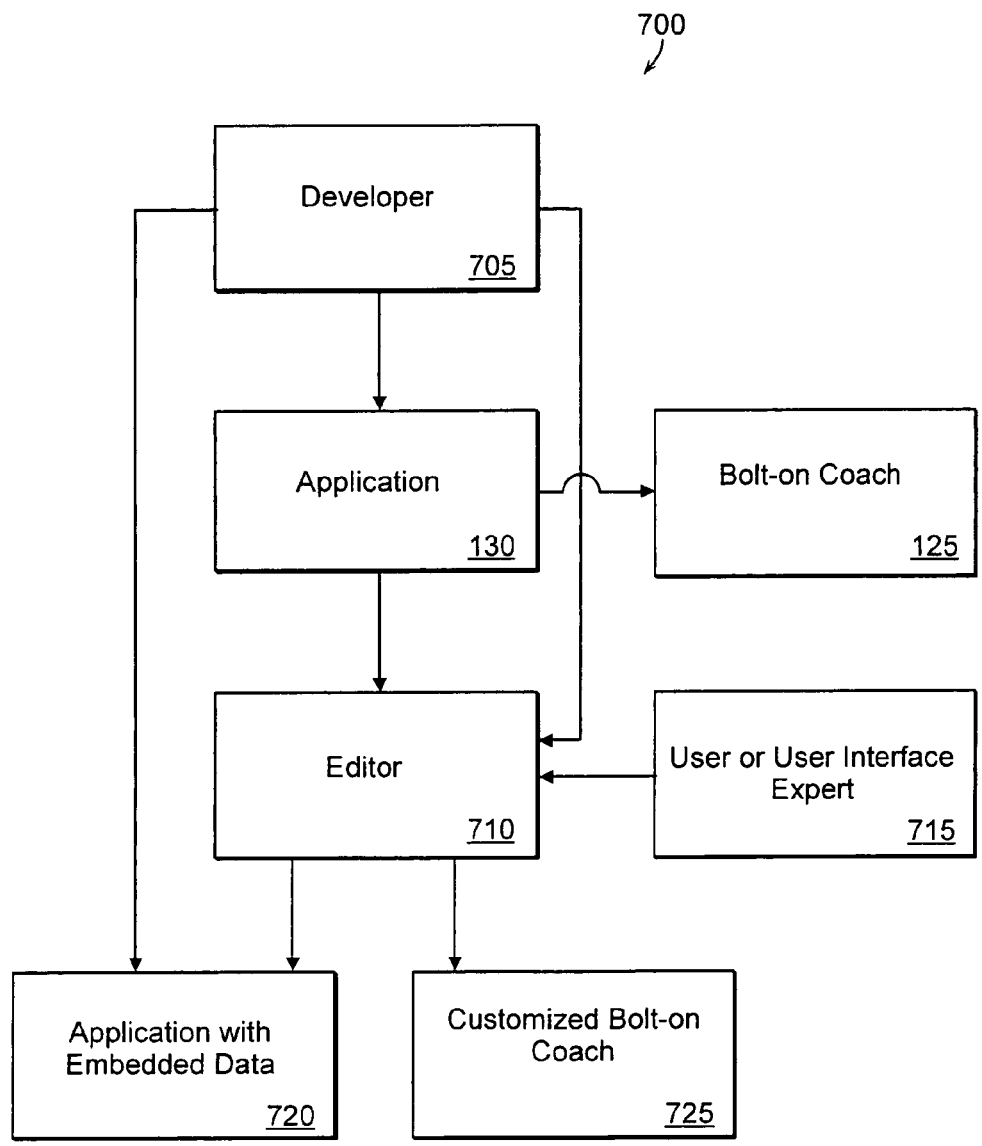
FIG. 7 is a block diagram that illustrates relationships among various development embodiments of the bolt-on coach of FIG. 1.

FIG. 7 is a block diagram that illustrates an environment 700 having relationships among various aspects and embodiments of the bolt-on coach 125. A developer 705 develops an application 130 using standard industry tools. The tools may include, a developing environment such as for Java™, C++, or visual basic.

A path from the application 130 to the bolt-on coach 125 indicates that, in one embodiment, the bolt-on coach 125 may observe user interactive elements in the software application 130 and generate task and instruction indications based on the observed user interactive elements.

A path from the application 130 to an editor 710 indicates that, alternatively, the editor 710 may be used on the application 130 to generate a customized bolt-on coach 725 or an application 130 with embedded data 720. The editor 710 may be used by a user or user interface expert 715 or by the developer 705.

A path from the developer 705 to the application with embedded data 720 indicates that, in another embodiment, the developer 705 directly embeds data into the application 130 generating the application with embedded data 720. The application with embedded data 720 may function with either the bolt-on coach 125 or the customized bolt-on coach 720. The customized bolt-on coach 725 may function with either the application 130 or the application with embedded data 720. By creating the application with embedded data 720 or the customized bolt-on coach 725, more robust enhancement may be provided than when using just the bolt-on coach 125 discussed above.

Figure 8:
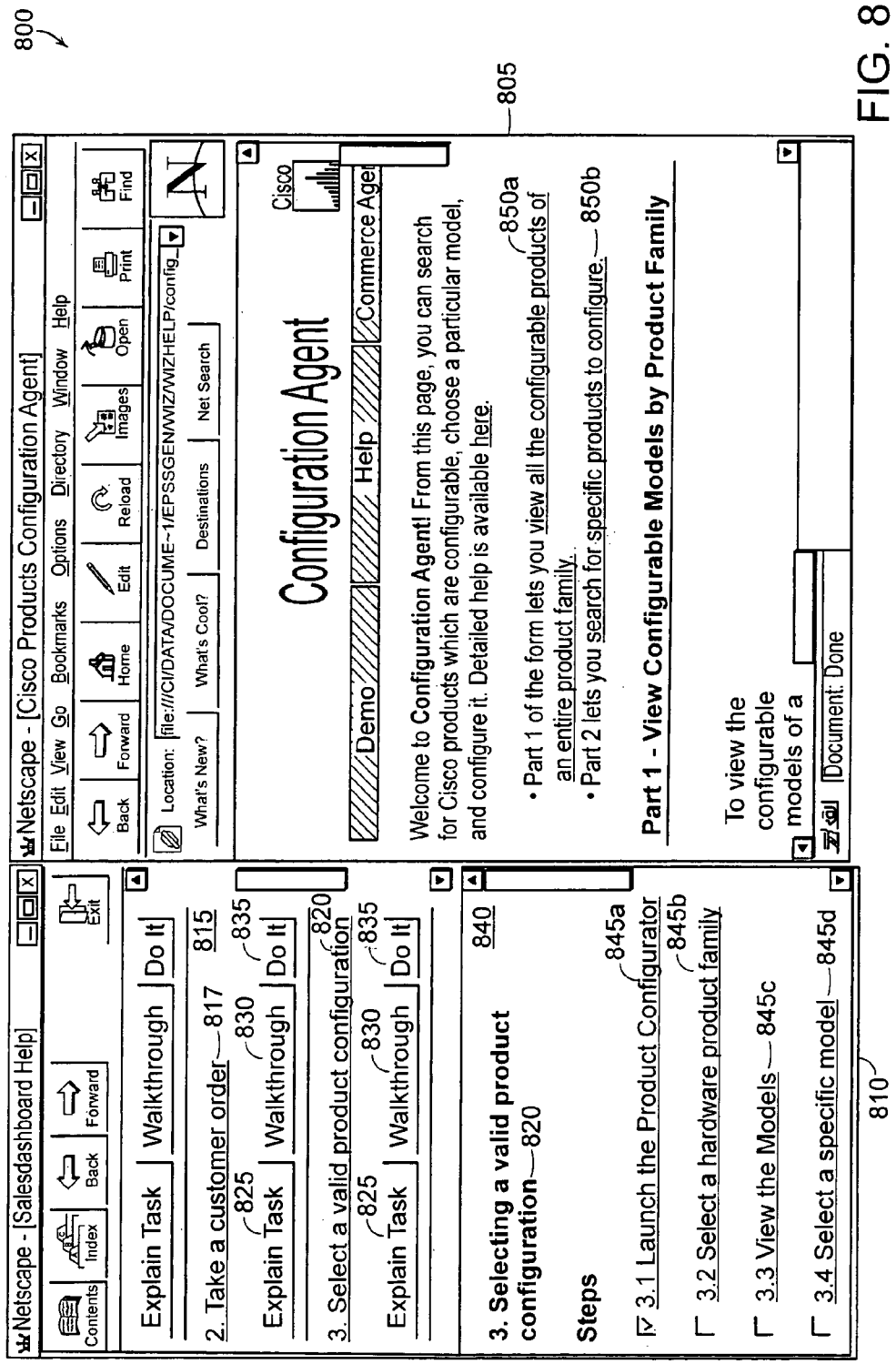
FIG. 8 is an example graphical user interface of the bolt-on coach of FIG. 1.

FIG. 8 is an example of a graphical user interface of the application 130 in which one embodiment of the bolt-on coach 125 may be employed. A graphical user interface window 800 may include an application panel 805 and bolt-on coach panel 810. The bolt-on coach panel 810 may be separate from the application panel 805 or may be incorporated within the application panel 805. In one embodiment, the bolt-on coach panel 810 may be hidden until activated by the user 135 or until remotely activated by the customer service representative 115.

The bolt-on coach panel 810 may include a task indication panel 815 or an instruction indication panel 840. In another embodiment, the task indication panel 815 and instruction indication panel 840 may be located outside of the bolt-on coach display panel 810.

The task indication panel 815 may include task indications 817 ("Take a Customer Order") and 820 ("Select a Valid Product Configuration") that may have been generated by the bolt-on coach 125. Task indications may be associated with user interactive elements, such as soft buttons 825, 830 and 835, or non-user interactive elements, such as a text descriptor (not shown).

The "Select a Valid Product Configuration" task indication 820 is an example task for which a user may receive coaching. Selecting the associated "Explain Task" soft button 825 brings up a help panel (not shown) explaining the task identified by the text of the task indication 820. Selecting the associated "Walk Through" soft button 830 brings up a wizard-type help panel (not shown) to guide a user through the task indicated by the text of the task indication 820. Selecting the associated "Do It" soft button 835 may bring up the panel displayed in an instructions panel 840.

The instructions panel 840 may include instruction indications 845a, 845b, 845c and 845d. Each instruction indication may be a task instruction associated with the task identified in the text of the task indication 820. In this example, the user 135 has selected the first instruction indication 845a, which causes the application 130 to launch the configuration agent in its GUI panel 805. Once an instruction has been completed—as the instruction represented by 845a in the graphical user interface window 800 has been in this example—the bolt-on coach 125 may update the indication such as with a check-mark to provide feedback to the user 135 indicating the user's (or bolt-on coach's 125, in one embodiment) successful completion of interaction with the user interactive elements in the application 130 associated with the instruction 845a.

The application panel 805 may include user interactive elements, such as hotlinks 850a, 850b. Selection of the hotlink 850a may cause the task indication 820 or instructions 845a-d to change state within the bolt-on coach instruction panel 840. In other words, the bolt-on coach 125 may have added a bi-directional instruction feature to the application 130, which is executed by the capability module 340 and interactive module 335 discussed above in reference to FIG. 3D. So, just as selection of an instruction indication 845a can cause the application 130 to change state, so too can election of a hotlink or other user-interactive element in the application panel 805 cause the bolt-on coach instruction panel 810 change state.

Figure 9:
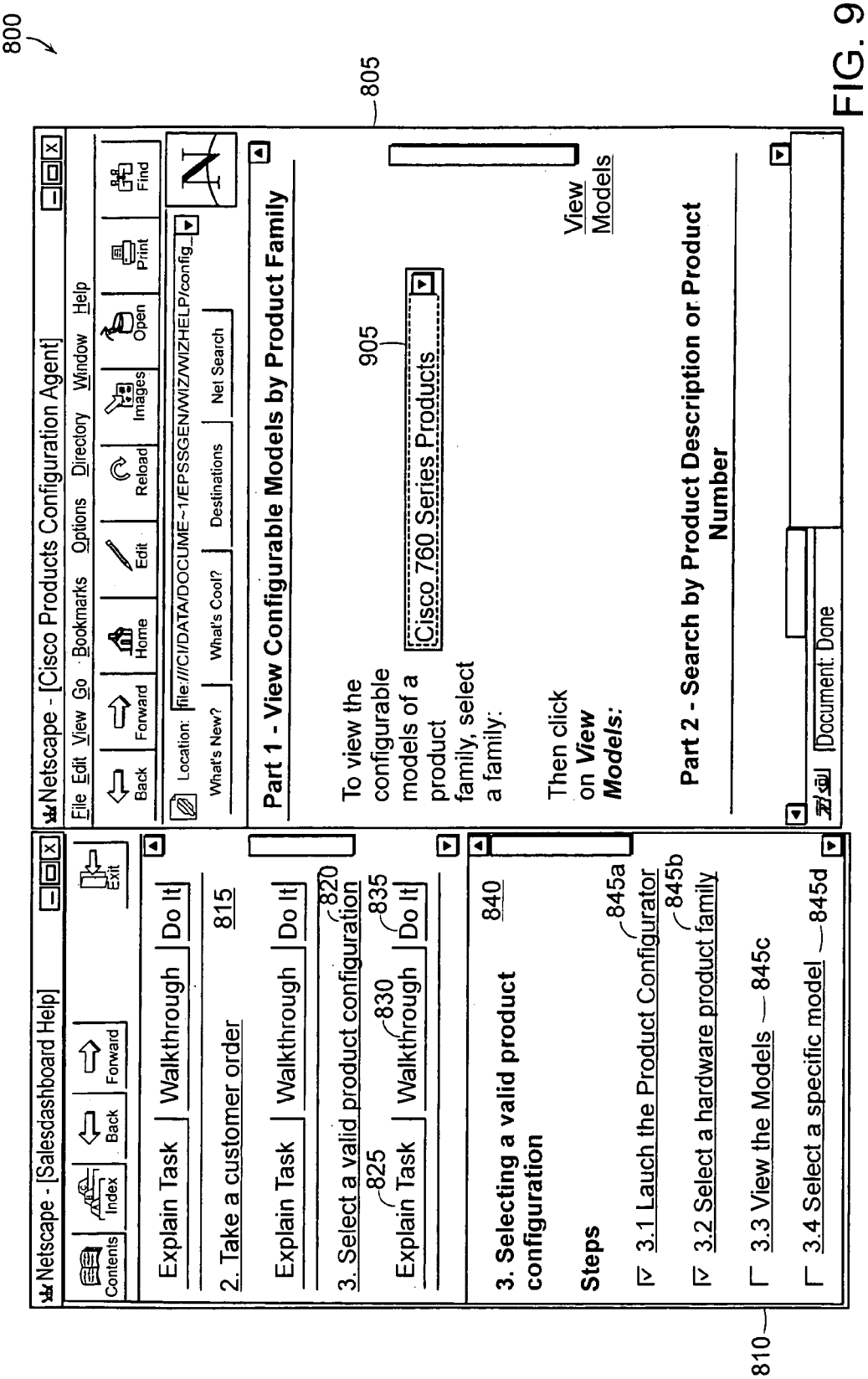
FIG. 9 is another example graphical user interface of the bolt-on coach of FIG. 1.

FIG. 9 is an example of the graphical user interface 800 after additional user interactions. In this example, the user 135 has selected a product (e.g., Cisco® 760 Series Products) from a user-interactive element 905, which is a drop-down menu box. The bolt-on coach 125 may have observed the completion of this instruction and updated the state of the instruction indication 845b in the instructions panel 840 with a checkmark to reflect the completion of the instruction.

Figure 10:
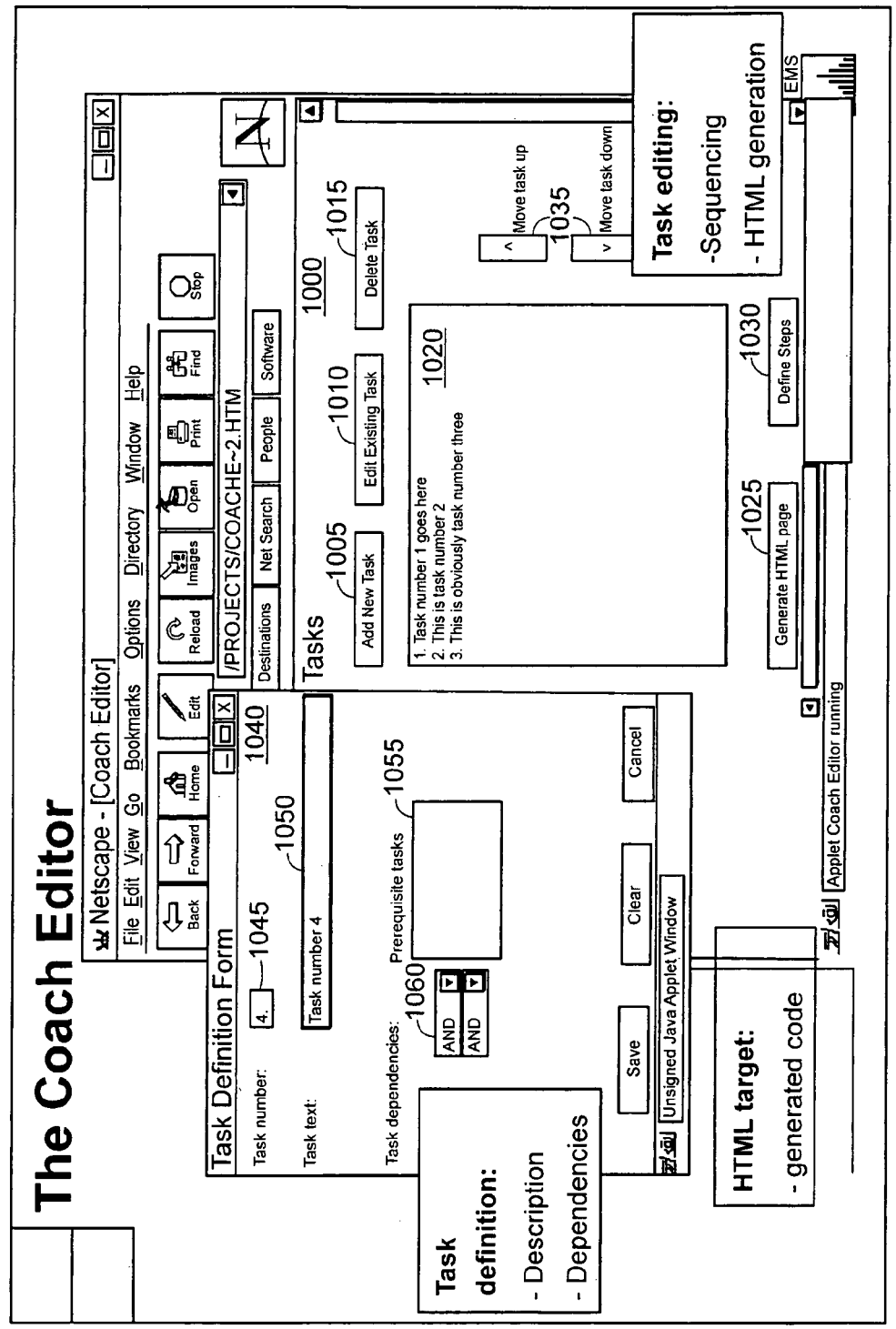
FIG. 10 is an example graphical user interface of an editor of FIG. 7.

FIG. 10 is an example graphical user interface of the coach editor 710. The coach editor 710 includes a tasks editing panel 1000. The tasks editing panel 1000 includes three soft buttons, an "add new task" soft button 1005, "edit existing task" soft button 1010, and "delete task" soft button 1015. The tasks editing panel 1000 may also include a task list box 1020, into which task indications are listed for the user 135. The sequence of the task indications are adjustable using "move task up" and "move task down" soft buttons 1035 in a typical GUI manner. The tasks editing panel 1000 also includes a "generate HTML page" soft button 1025 and "define steps" soft button 1030, described in more detail below.

In operation, the user 135, customer service representative or customer service engineer 115, or software application developer 705 may choose to use the coach editor 710 to add a new task to add to the bolt-on coach 125 for use by the user 135 in learning or using the application 130. To do so, the individual clicks on the "add new task" soft button 1005, which brings up a task definition form panel 1040. The task definition form panel 1040 includes a task number field 1045, task text field 1050, and task dependencies field, which includes a prerequisite tasks field 1055 and Boolean operator fields 1060. In this example, a task number 4 has been defined and is not dependent on any prior tasks. The coach editor 710 allows the person defining task number 4 to be defined as following tasks 1 and 2 or 1 and 3 or 1, 2 and 3, where execution of task number 4 prior to successful completion of the previous tasks results in a message to the user 135. The task text in the task text field 1050 can be changed to more accurately reflect the task in the application 130 so as to make the coaching easier for the user 135 to understand relative to what he is trying to learn.

Referring back to the tasks editing panel 1000, the person entering the task(s) may choose to edit an existing task or delete an existing task, in a typical GUI manner through use of the other soft buttons 1010 and 1015 above the task list field 1020.

The soft button 1030 is used by the person defining the tasks to provide the steps for each task. This soft button 1030 brings up another screen (not shown), which enables the person to enter the definition of the steps (e.g., as shown in FIG. 8, steps 845a, 845b, etc.) making up a task (e.g., as shown in FIG. 8, task indication 820). This screen, used for step definitions, is similar to the tasks editing panel 1000, allowing adding, deleting, and reordering of steps rather than tasks, as well as specifying step dependencies, similar to one of the functions of the tasks definition form panel 1040.

The soft button 1025 may be used to generate the bolt-on coach screen, which, in this embodiment, is an HTML page, such as the bolt-on coach panel 810 in FIG. 9.

Figure 11:
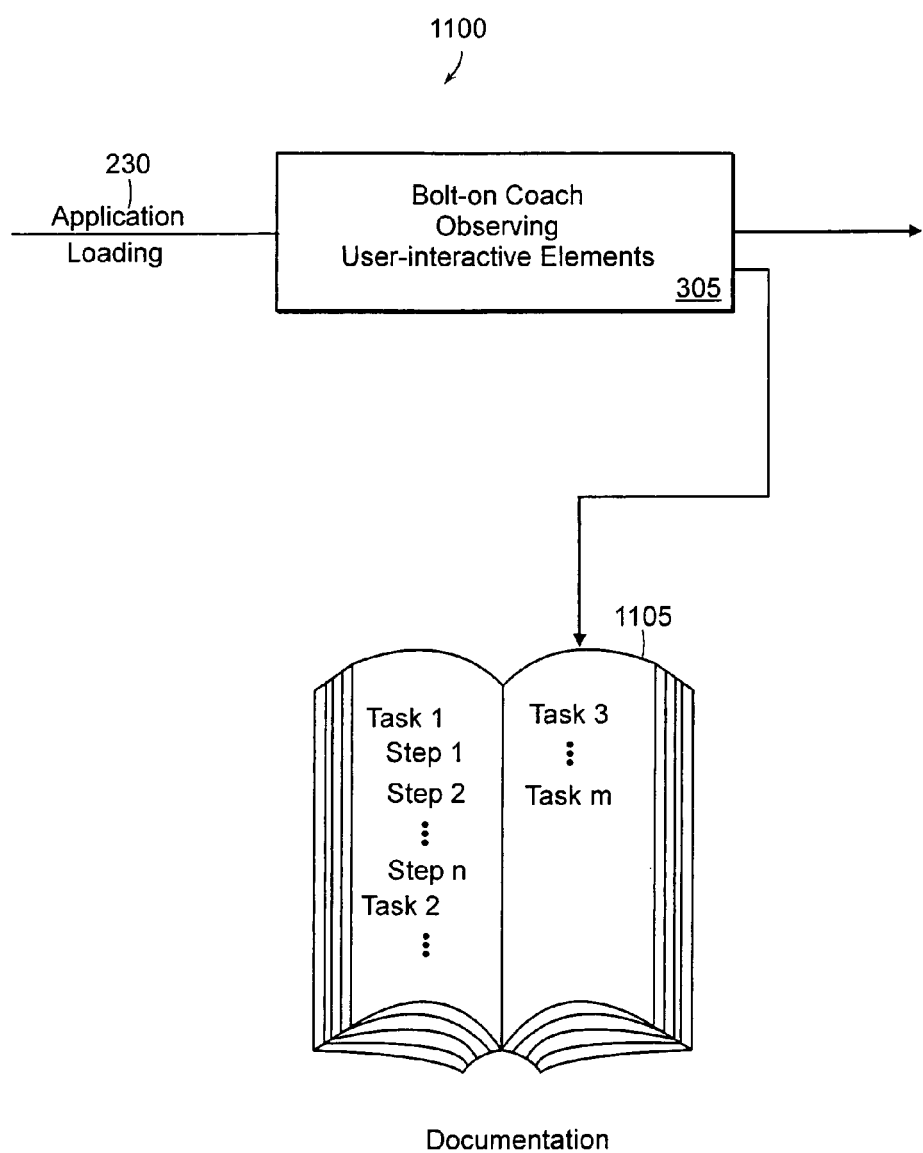
FIG. 11 is a block diagram of an alternative process of the bolt-on coach of FIG. 1.

FIG. 11 is a block diagram of an alternative application 1100 of the bolt-on coach 125. In this application, the bolt-on coach 125 observes the user interactive elements of the software application 130 (step 305) as the application is loading (step 230). Based on the observed user interactive elements, the bolt-on coach 125 generates task and instruction indications (step 310) to produce documentation 1105, such as a list of tasks and instructions for use in software document or user's manual 1105. In another embodiment, the bolt-on coach 125 may observe user interactive elements while the application is executing. Screen capture and image-to-text technology may be employed or observation of user interaction or messaging may assist the bolt-on coach 125 in determining the user-interactive elements for generating the task and instruction indications.

In an alternative embodiment, a user knowledgeable with the software application or a designer of the software application may predefine tasks and associated instructions, optionally using the editor 710 (FIG. 7) designed for this purpose. The system may observe the predefined tasks and instructions and generate indications, accordingly.

Figure 12:
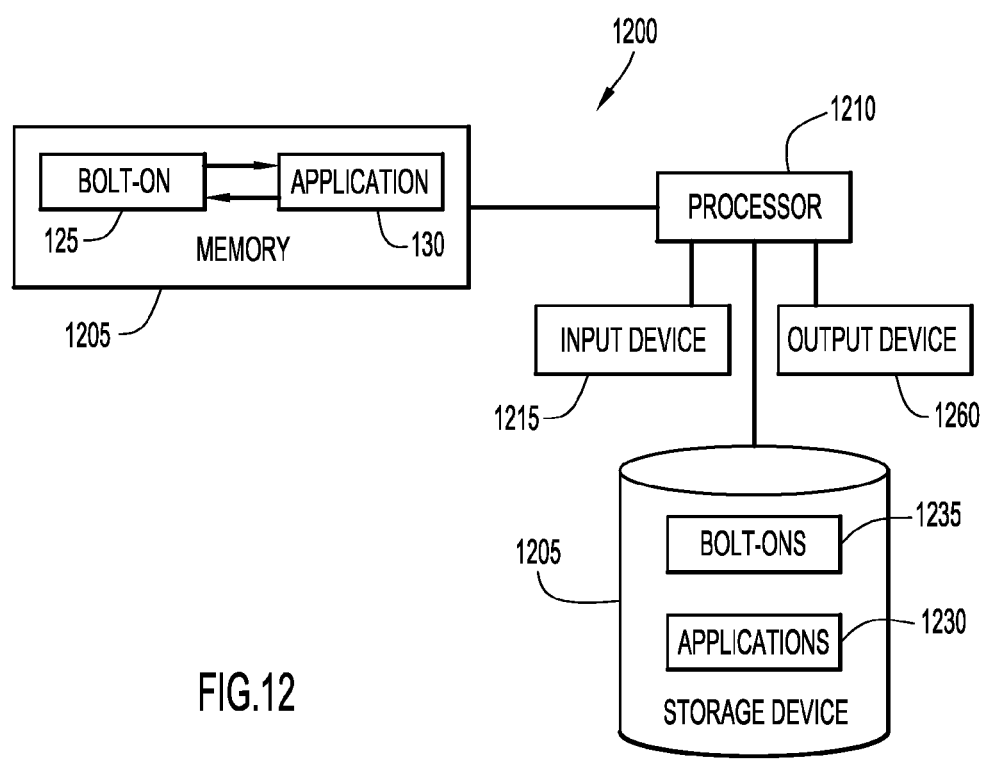
FIG. 12 is a block diagram illustrating an exemplary computer system in which an embodiment of the bolt-on coach of FIG. 1 may be deployed.

FIG. 12 is a block diagram illustrating an exemplary computer system 1200 in which an embodiment of the bolt-on coach 125 may be deployed. The computer system 1200 may include a processor 1210, input device 1215, output device 1220, memory 1205, and storage device 1225. The storage device 1225 may include bolt-on coaches 1235 and applications 1230. The bolt-on coaches 1235 include the bolt-on coach 125, and the applications 1230 include the application 130. In the state of the computer system 1200 shown, the processor 1210 has loaded the bolt-on coach 125 and the application 130 into the memory 1205 and is executing them with the interactions between them as shown and described above. It should be understood that the processor 1210 may be any general or custom computer processor, and the memory 1205 may be RAM, ROM, CD-ROM, magnetic or optical disk, or other media capable of storing computer software. Also, the input device 1215 is a typical human-to-machine or machine-to-machine interface, and the output device 1220 is a typical machine-to-machine device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing task-oriented enhancement for a software application, the method comprising:

observing user-interactive elements as they are streamed by parsing a byte stream for the user-interactive elements, the user-interactive elements being loaded in a software application while the software application is loading before runtime; and based on the byte stream observed and while the software application is loading before runtime, generating, in real-time, (i) at least one task associated with the software application and (ii) at least one instruction associated with said at least one task to provide task-oriented enhancement of the software application, wherein the at least one task and the at least one instruction were not predefined or previously associated with the software application in advance of the software application being loaded.

2. A method according to claim 1 wherein generating the at least one task and at least one instruction includes supporting interactivity with the software application for an end-user.

3. A method according to claim 1 wherein generating the at least one task and at least one instruction includes inserting capability into the software application.

4. A method according to claim 1 wherein generating the at least one task and at least one instruction includes:
displaying the task and instruction on a separate panel.

5. A method according to claim 1 wherein observing the user-interactive elements occurs before the software application is executed.

6. A method according to claim 1 wherein generating the at least one task and at least one instruction includes providing at least one additional user-interactive element.

7. A method according to claim 1 wherein generating the at least one task and at least one instruction is done in an automated manner.

8. A method according to claim 1 wherein generating the at least one task and at least one instruction is done in a semi-automatic manner.

9. A method according to claim 8 wherein the semi-automatic manner includes receiving guidance for the task and instruction from a task editor.

10. A method according to claim 8 wherein generating the at least one task and at least one instruction in a semi-automatic manner includes receiving guidance for the task and instruction from a designer or user of the software application.

11. A method according to claim 1 wherein the method further includes remotely executing the at least one task associated with the software application to provide technical support or task automation to a user.

12. A method according to claim 1 further including creating documentation that includes the at least one task and at least one instruction to provide the task-oriented enhancement for the software application.

13. The method according to claim 1 wherein generating the at least one task and at least one instruction includes:
incorporating the at least one task and the at least one instruction into a graphical user interface of the software application.

14. The method according to claim 1 wherein generating the at least one task and at least one instruction includes:
hiding the at least one task and the at least one instruction until activated.

15. An apparatus for providing task-oriented enhancement for software applications, the apparatus comprising:
a processor;
a system to observe user-interactive elements as they are streamed by parsing a byte stream for the user-interactive elements, the user-interactive elements being loaded in a software application while the software application is loading before runtime; and a generator coupled to the system to generate, in real-time based on the byte stream observed and while the software application is loading before runtime, (i) at least one task associated with the software application and (ii) at least one instruction associated with said at least one task to provide task-oriented enhancement of the software application, wherein the at least one task and the at least one instruction were not predefined or previously associated with the software application in advance of the software application being loaded.

16. An apparatus according to claim 15 further including an interactive module coupled to (i) the generator to receive the tasks and instructions and (ii) the software application to support interactivity with the software application for an end-user.

17. An apparatus according to claim 16 wherein the generator inserts a capability module into the software application to communicate with the interactive module to add capability to the software application or the interactive module.

18. An apparatus according to claim 15 wherein the at least one task and at least one instruction are (i) displayed on a separate panel.

19. An apparatus according to claim 15 wherein the system observes the user-interactive elements before the software application executes.

20. An apparatus according to claim 15 wherein the generator generates at least one additional user-interactive element coupled to the generator, the system, or the software application.

21. An apparatus according to claim 15 wherein the generator generates the at least one task and at least one instruction in an automated manner.

22. An apparatus according to claim 15 wherein the generator generates the at least one task and the at least one instruction in a semi-automatic manner.

23. An apparatus according to claim 22 further including a task editor coupled to the generator to provide guidance to the generator to generate the task and instruction.

24. An apparatus according to claim 22 further including a guidance module, provided by a designer or user of the software application, coupled to the generator to provide guidance to the generator to generate the task and instruction.

25. An apparatus according to claim 15 wherein the system includes a monitoring module to monitor user interaction with the software application.

26. An apparatus according to claim 25 wherein the monitoring module tracks user interaction with the software application, provides feedback to a user based on interaction with the software application, or interacts with the software application.

27. An apparatus according to claim 15 wherein the apparatus further includes a remote control module coupled to the generator, the system, or the software application to remotely execute the task associated with the software application to provide technical support or task automation to a user.

28. An apparatus according to claim 15 wherein the task-oriented enhancement is documentation of the software application that includes the generated task and instruction.

29. An apparatus according to claim 15 wherein the generator is configured to generate the at least one task and the at least one instruction so as to incorporate the at least one task and the at least one instruction into a graphical user interface of the software application.

30. An apparatus according to claim 15 wherein the generator is configured to generate the at least one task and at least one instruction so as to hide the at least one task and at least one instruction until activated.

31. An apparatus for providing task-oriented enhancement for software applications, the apparatus comprising:

a processor;

means for observing user-interactive elements as they are streamed by parsing a byte stream for the user-interactive elements, the user-interactive elements being loaded in a software application while the software application is loading before runtime; and means for generating, in real-time based on the byte stream observed and while the software application is loading before runtime, (i) at least one task associated with the software application and (ii) an instruction associated with said at least one task to provide task-oriented enhancement of the software application, wherein the at least one task and the at least one instruction were not predefined or previously associated with the software application in advance of the software application being loaded.

32. A computer-readable medium having stored thereon sequences of instructions, the sequences of instructions, when executed by a digital processor, causing the processor to perform:

observing user-interactive elements as they are streamed by parsing a byte stream for the user-interactive elements, the user-interactive elements being loaded in a software application while the software application is loading before runtime; and based on the byte stream observed and while the software application is loading before runtime, generating, in real-time, (i) at least one task associated with the software application and (ii) an instruction associated with said at least one task to provide task-oriented enhancement of the software application, the at least one task and the at least one instruction were not predefined or previously associated with the software application in advance of the software application being loaded.

33. A computer-readable medium according to claim 32 wherein generating the at least one task and at least one instruction includes supporting interactivity with the software application for an end-user.

34. A computer-readable medium according to claim 32 wherein generating the at least one task and at least one instruction includes inserting capability into the software application.

35. A computer-readable medium according to claim 34 wherein inserting capability occurs before the software application is executed.

36. A computer-readable medium according to claim 32 wherein generating the at least one task and at least one instruction includes: displaying the task and instruction on a separate panel.

37. A computer-readable medium according to claim 32 wherein observing the user-interactive elements occurs before the software application is executed.

38. A computer-readable medium according to claim 32 wherein generating the at least one task and at least one instruction includes providing at least one additional user-interactive element.

39. A computer-readable medium according to claim 32 wherein generating the at least one task and at least one instruction is done in an automated manner.

40. A computer-readable medium according to claim 32 wherein generating the at least one task and at least one instruction is done in a semiautomatic manner.

41. A computer-readable medium according to claim 40 wherein the semi-automatic manner includes receiving guidance for the task and instruction from a task editor.

42. A computer-readable medium according to claim 40 wherein generating the at least one task and at least one instruction in a semi-automatic manner includes receiving guidance for the task and instruction from a designer or user of the software application.

43. A computer-readable medium according to claim 32 wherein the instructions further cause the processor to perform remotely executing the task associated with the software application to provide technical support or task automation to a user.

44. A computer-readable medium according to claim 32 wherein the instructions further cause the processor to perform creating documentation that includes the at least one task and at least one instruction to provide the task-oriented enhancement for the software application.

45. A computer-readable medium according to claim 32 wherein the instructions that cause the processor to generate comprise instructions that cause the processor to generate the at least one task and at least one instruction so as to incorporate the at least one task and at least one instruction into a graphical user interface of the software application.

46. A computer-readable medium according to claim 32 wherein the instructions that cause the processor to generate comprise instructions that cause the processor to generate the at least one task and at least one instruction so as to hide the at least one task and at least one instruction until activated.

* * * * *